Patented Dec. 18, 1951

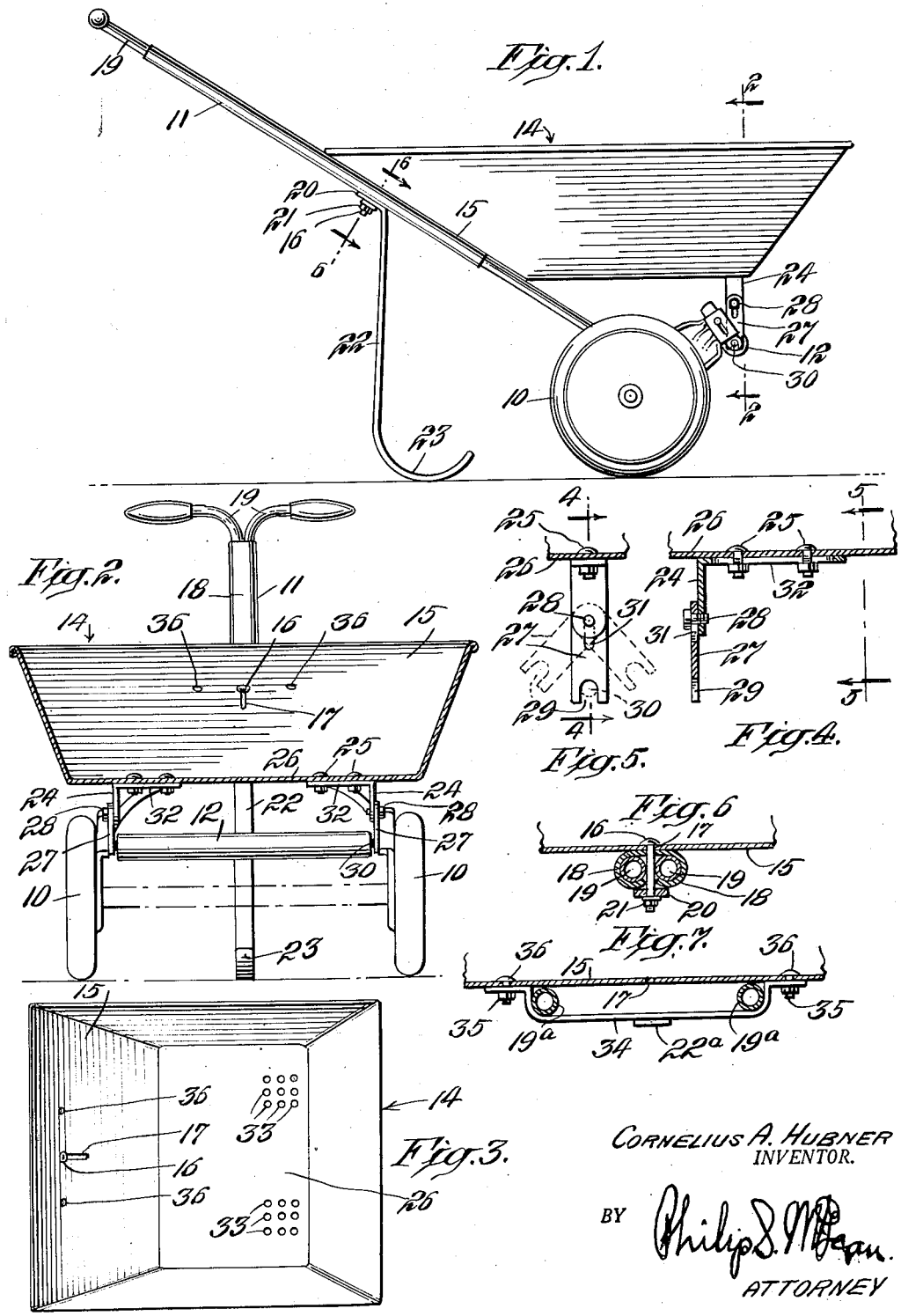

2,579,077

UNITED STATES PATENT OFFICE 2,579,077

BARROW ATTACHMENT FOR LAWN MOWERS

Cornelius A. Hubner, Bloomingdale, N. J.

Application August 16, 1947, Serial No. 769,003

1 Claim. (Cl. 280—51)

The invention herein disclosed is an attachment for converting an ordinary lawn mower to the uses of a wheelbarrow.

Objects of the invention are to provide a barrow attachment which can be quickly applied to or be as readily removed from a lawn mower and which in the attached relation will provide an entirely satisfactory, efficient and practical wheelbarrow construction.

Particular objects of the invention are to provide a barrow attachment which can be adapted to and used with mowers of different sizes and proportions and which in its use will not disturb any adjustments or settings of the lawn mower, thus not interfering in any way with the usual and proper use of the mower.

Further special objects of the invention are to provide a barrow attachment of light weight and which will be so connected with the lawn mower as to be braced and reinforced by the structure of the latter and which will be of such character that when not in use it may be conveniently stored, out of the way, for example, as by being hung inconspicuously on the side of a wall or the like.

Other special objects of the invention are to provide a barrow attachment which will be fully and firmly braced and supported when mounted over a lawn mower in the upside down free wheeling position and which in that relation will provide for the supporting of the converted lawn mower in a wheelbarrow-like position, ready to receive or to discharge a load of material.

Other desirable objects attained by the invention are set forth or will appear in the course of the following specification wherein details of the invention are disclosed and the various features of invention defined and broadly claimed.

The drawing accompanying and forming part of the specification illustrates certain present preferred embodiments of the invention but structure may be modified and changed as regards the immediate illustration, all within the true intent and broad scope of the invention as hereinafter defined and claimed.

Figure 1 in the drawing is a side elevation showing the barrow attachment applied to and in use on an ordinary lawn mower.

Figure 2 is a vertical cross sectional view as on substantially the plane of line 2—2 of Figure 1.

Figure 3 is a detached plan view of the hopper or container.

Figures 4 and 5 are broken sectional details of one of the adjustable brackets for supporting the lower or forward end of the carrier or container, Figure 4 appearing as on the section line 4—4 of Figure 5 and Figure 5 appearing as on the section line 5—5 of Figure 4.

Figure 6 is a broken sectional detail of the clamp for securing the upper, back portion of the carrier in position supported on the handle of the machine with parts appearing as on substantially the plane of line 6—6 of Figure 1.

Figure 7 is a similar view of another form of clamp for a different kind of mower handle.

In Figures 1 and 2 a lawn mower is illustrated, of conventional design in the sense of having wheels 10, a handle 11, a ground roller 12 and incorporating one-way drive clutches enabling it to be pushed by the handle in free wheeling condition when reversed or turned upside down as indicated.

A carrier or holder is illustrated at 14, in the nature of a shallow pan or hopper, with inclined sides, facilitating loading and dumping.

The inner or rearward sloping wall 15 is of special significance in that its angle of incline is selected to approximate or more or less match the incline of the handle in the reversed relation of the mower shown.

To secure the container in this position resting on and partly supported by the inclined handle, there is provided a clamp or securing device shown in Figures 1 and 6 as simply a bolt 16 extended through an opening 17 in the back wall and through the sheath 18 covering the tubes 19 forming the handle, with a bar or clamp plate 20 secured over the back of the sheath by a nut 21 on the bolt.

The clamp plate 20 serves an additional purpose in the illustration by being extended downward at an angle in the form of an upright 22 with a forwardly bent extension 23 at the lower end of the same to form a leg and supporting foot in the rest position of the carrier.

The lower or forward end portion of the holder 14 is positioned and supported in the illustration by angle brackets 24 secured by bolts 25 to the bottom wall 26 and by swing links 27 bolted to the lower ends of the angle brackets at 28 and having forked lower ends 29 to engage over the axle or spindle 30 of the roller 12.

The pivotal securing of the forked links or yokes 27 at 28 enables a certain forward and back adjustment of the container to fit closely back against the handle 11 and to permit a certain vertical extent of adjustment the links 27 are shown slotted at 31 where they pass over the pivot bolts 28.

To allow and provide for a certain amount of lateral adjustment, particularly to fit the front brackets to lawn mowers of different widths, the upper horizontal arms of the angle brackets 24 may be slotted as shown at 32 in Figure 4 where they receive the securing bolts 25.

If desired, the hole 17 for the handle clamping bolt 16 may be enlarged or extended in the form of a slot, as indicated in Figure 2, to permit of a certain amount of up and down adjustment of the carrier or holder on the handle.

Additionally, the bottom 26 is shown as having several series of openings 33 for the bottom clamp bolts 25, enabling the brackets 24 to be set further forward or back and laterally inward and outward to suit different kinds and sizes of lawn mowers.

To enable the carrier being applied to a lawn mower having widely spaced handle members 19a, Figure 7, the handle clamping means may be in the form of a strap 34 to extend across the back of such handle members and secured at its ends by bolts 35 engaged in openings 36 in the back wall 15. With this strap form of clamp the supporting foot or leg 22a may be secured as by welding at its upper end to this clamp member.

With the various adjustments provided in the illustration, the container may be quickly and easily fitted and secured to practically any ordinary design and size of lawn mower. Secured as shown resting mainly or to a large extent on the handle, the container is firmly braced and supported and thus reinforced may be of relatively thin and light material. Also in this supported relation the carrier is fairly evenly balanced over the supporting wheels 10, enabling the device to be conveniently and easily used after the manner and for the purposes of an ordinary wheelbarrow.

The holder or carrier 14 may be made of different materials such as light sheet metal, plywood, basket work or framed canvas or other fabric. This light form of container may be easily handled in putting it on and taking it off the back of the mower and when not in use may be hung up out of the way on the side of a wall or the like. The rounded skid-like form of shoe 23 at the lower end of the support bar 22 permits of pushing the barrow along, without lifting, if that be desired for any special reasons. The various adjustable attaching means are such that the carrier may be more or less automatically centered over the back of the mower by simply loosening them and rocking the carrier down into a settled, firm, supported relation over the roller at the front and the handle at the back, tightening the nuts and bolts in their more or less self-adjusted relations after thus fitting the container into position on the mower.

All parts are of simple construction and inexpensive cost and the use of the carrier does not alter or impair any particular or critical adjustments that may have been made on the mower.

While usually desirable to have the forked links 27 engage over the spindle or axle 30 at the ends of the roller, it is contemplated that the supporting means for the forward portion of the barrow may engage directly over the roller 12 or engage portions of the frame in which the roller is journaled. The angle of the handle with respect to the roller or the frame carrying the roller may vary in different lawn mowers. The swing links and other adjustable means described allow for these variations in angularity.

What is claimed is:

A barrow attachment comprising a holder for mounting on a lawn mower of the type having an inclined handle and a ground roller with spindle portions exposed at opposite ends of the same and disposed in upside down free wheeling position, said holder having a back wall inclined to match the inclination of the handle of the lawn mower in such upside down relation and a bottom wall projecting forwardly and in spaced relation above the ground roller of the mower, angle brackets engaged with said bottom wall and having dependent end portions, means securing said brackets to said bottom wall in laterally adjusted relation and in forwardly positioned relation from the handle whereby said brackets are in overlying relationship to the ground roller, swing links pivotally mounted on the dependent end portions of said brackets and having forked lower ends adapted to engage said exposed spindle portions, an upright bar having a rounded lower end for engagement with the ground and an angled upper end for engagement with the back of the inclined handle, and a bolt extending through said inclined upper end of the bar and through the inclined back wall of the holder for removably clamping said bar and holder to opposite sides of the inclined handle.

CORNELIUS A. HUBNER.

REFERENCES CITED

The following references are of record in the file of this patent:

UNITED STATES PATENTS

| Number | Name | Date |
|---|---|---|
| 1,338,144 | McNeill | Apr. 27, 1920 |
| 1,876,409 | Gordon | Sept. 6, 1932 |
| 2,165,551 | Iverson | July 11, 1939 |
| 2,326,739 | Andrews | Aug. 17, 1943 |
| 2,450,236 | Hoffman | Sept. 28, 1948 |
| 2,502,138 | Foreit | Mar. 28, 1950 |

FOREIGN PATENTS

| Number | Country | Date |
|---|---|---|
| 205,944 | Germany | Jan. 20, 1909 |